United States Patent

Assmus

[11] 3,855,787
[45] Dec. 24, 1974

[54] ATTACHMENT FOR THE HANDS OF A WATCH

[75] Inventor: Friedrich Assmus, Schramberg, Germany

[73] Assignee: Firma Gebruder Junghans G.m.b.H., Schramberg, Germany

[22] Filed: Mar. 23, 1973

[21] Appl. No.: 344,148

[30] Foreign Application Priority Data
Apr. 1, 1972  Germany.............................. 125361

[52] U.S. Cl. .......................... 58/126 D, 58/126 R
[51] Int. Cl. ......................................... G04b 19/00
[58] Field of Search .......... 308/121, 134.1, 238, 21, 308/DIG. 7; 74/10 R, 10.45; 116/DIG. 6, 136.5, 124.1, 124.2, 129 R; 73/431; 58/126 R, 106, 85.5, 126 D

[56] References Cited
UNITED STATES PATENTS

| | | | |
|---|---|---|---|
| 52,849 | 2/1866 | Hastings.......................... | 116/136.5 |
| 587,136 | 7/1897 | Porter............................... | 58/126 R |
| 1,192,811 | 7/1916 | Borresen.......................... | 58/126 D |
| 1,979,289 | 11/1934 | Smith............................... | 116/136.5 |
| 2,541,790 | 2/1951 | Sugden et al. .................... | 73/411 X |
| 3,002,335 | 10/1961 | Kripak ............................. | 58/106 X |
| 3,375,654 | 4/1968 | Jeanmonod............................. | 58/59 |
| 3,425,212 | 2/1969 | Verde .............................. | 58/116 R |
| 3,442,129 | 5/1969 | Odson........................ | 116/129 R X |
| 3,548,587 | 12/1970 | Wood .............................. | 58/85.5 X |

Primary Examiner—Richard B. Wilkinson
Assistant Examiner—U. Weldon
Attorney, Agent, or Firm—Burns, Doane, Swecker & Mathis

[57] ABSTRACT

An indicator hand, preferably for a watch, is mounted on a plastic attachment portion of a gear mechanism. The gear mechanism and an aperture portion of the hand are provided with projections which provide a firm engagement therebetween. The projections may be defined by axial grooves or by the edges of a slit which opens into the aperture.

4 Claims, 6 Drawing Figures

PATENTED DEC 24 1974　　　　　　　　　　　3,855,787

ATTACHMENT FOR THE HANDS OF A WATCH

BACKGROUND OF THE INVENTION

The invention relates to an arrangement preferably in watches, for the attachment of an indicator hand on a plastic part of a hand-receiving gear mechanism.

Part of a gear mechanism on which a hand is to be attached is, for example, the tube-shaped attachment of a hour wheel of a watch. On this tube-shaped arrangement a hand is placed. The hand customarily is equipped with an aperture, such as a bushing having a bore so that it can be driven by friction by the tube-shaped arrangement. At the same time, the bore for the hand, or an eye for the hand, or the bushing for the hand are usually slit.

It has turned out that in the case of use of a tube-shaped arrangement made of plastic, the tube, for reasons of spray techniques, presents a smooth outside wall. Due to this and the fact that the tube is shaped slightly conically, a frictionally placed hand gradually works itself loose. This is particularly the case, whenever the hand or its bushing consists of metal.

OBJECTS OF THE INVENTION

It is therefore a general object of the invention to eliminate or substantially alleviate problems of the type discussed previously.

It is a specific object of the invention to create an arrangement, especially in a watch, for the firm attachment of a gear and a hand despite the use of a plastic attachment part.

It is another specific object of the invention to create an arrangement for the attachment of a hand on a plastic part of a gear mechanism which will guarantee a secure attachment of the hand.

It is still another object of the invention to provide such an arrangement without hindering the installation and adjustment operations normally featured between the hand and the gear.

It is yet another object of the invention to enable such a secure attachment to be adaptable to virtually all forms of presently utilized devices of this type.

BRIEF SUMMARY OF PREFERRED EMBODIMENTS OF THE INVENTION

In accordance with the preferred embodiments of this invention, the hand and the gear mechanism are maintained in an effective self-gripping relationship despite the presence of a plastic attachment portion. According to the invention, this will be achieved by the fact that the hand-receiving area of the plastic part of the gear mechanism and/or the inside wall of the bore or bushing of the hand are provided with projections or indentations. Preferably the projections or indentations are formed by fine grooves running in the direction of the axis. In the case of a watch, these fine grooves are provided effectively on an attachment of the hour wheel. Additionally, the fine grooves can also be provided in the inside wall of the bore of the hands or the bushing of the hands.

Advantageously, the grooves are evenly distributed on the outside periphery of the plastic part of the gear mechanism or of the attachment to the hour tube, or on the inside periphery of the bore of the hand or the bushing of the hand. Preferably, the grooves are disposed with a spacing of 0.1 mm or smaller. Effectively, the grooves will have a profile which is limited by essentially straight lateral walls which enclose an angle of 90° or more than 90°.

It is also possible that the counter grooves of the hand, engaging with the grooves of a gear part, may be formed by the edges of slits which are defined by a slit hand or a slit bushing of the hand.

The arrangement according to the invention makes possible a firm seat of the hand on the plastic part of the gear mechanism, whereby any automatic loosening, i.e., gradual self-loosening, is avoided with certainty.

THE DRAWING

The invention will be explained in more detail in the following paragraphs in a few embodiments shown by way of example and on the basis of the drawing.

DETAILED DESCRIPTION OF THE PREFERRED EMBODIMENTS

Figure 1E:
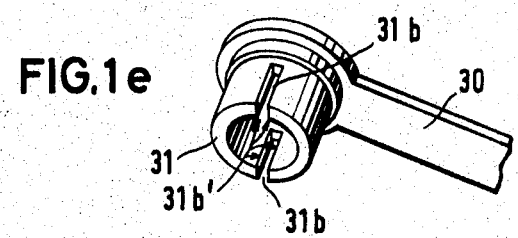
FIG. 1e shows a hand with a slit bushing of the hand.
Figure 1D:
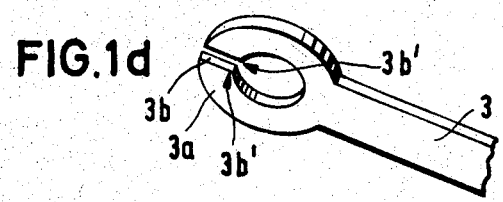
FIG. 1d shows a hand with a slit eye of the hand.
Figure 1C:
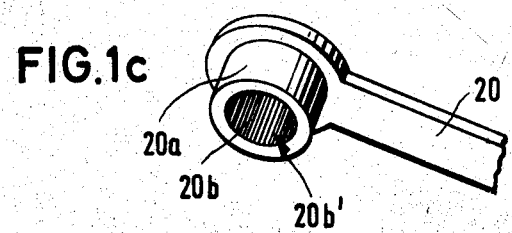
FIG. 1c shows a hand according to the invention in which the eye of the hand is reinforced by a bushing attachment.
Figure 1B:
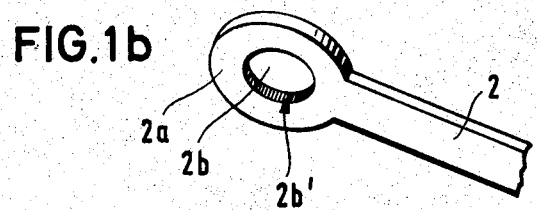
FIG. 1b shows a hand with a closed bore of the hand or a closed eye of the hand according to the invention.
Figures 1A, 2:
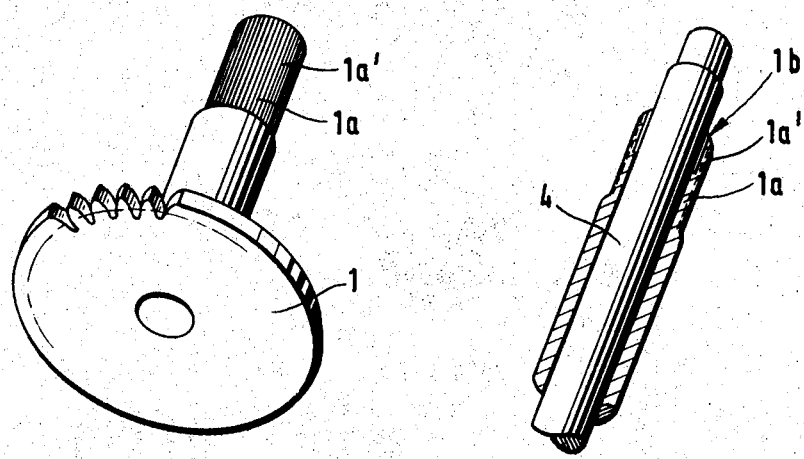
FIG. 1a shows an hour wheel of a watch with a tip stretched hour tube made of plastic, which is developed in accordance with the invention.
FIG. 2 is a cut through a part of an hour tube which is penetrated by a minute shaft.

In FIG. 1a an hour wheel has been designated by 1, which wheel has a tube shaped attachment 1a for the reception of a hand. The hour wheel is mounted within the watch in well-known fashion so as to be rotatably driven. In this tube-shaped attachment 1a projections or indentations have been provided which are developed preferably as grooves 1A'. These grooves are arranged evenly around the periphery of the attachment 1a, and with a spacing in the magnitude of about 0.1 mm. In profile, these grooves effectively are limited, or defined, by planar side walls, which walls together form an angle of preferably 90° or more. A hand with its bore or its eye is placed onto the grooved attachment 1a. The grooves assure a firm hold of the hand on the attachment 1a, whereby a twisting of the hands on the attachment 1a, as is required for alignment, is still possible. A gradual loosening of the hands from the attachment, however, is avoided with certainty.

The hand 2, which has been partially shown in FIG. 1b, has an aperture or bore 2b of an eye 2a of the hand. In the bore 2b, projections in the form of grooves 2b' are provided, which effectively correspond to the grooves 1a' of the attachment 1a of the hour tube (FIG. 1a). The delicate grooves on the attachment 1a of the hour tube and in the bores 2b of the eye 2a of the hand make a very firm seat of the hand possible, which certainly avoids any gradual self-loosening as had been found in the case of the hitherto known hand and gear attachements. On the other hand, the hand 2, after being put onto the attachment 1a of the hour tube, can be twisted more easily for the proper alignment than had been the case with the hitherto known arrangements.

In FIG. 1c, the partially shown hand is designated by 20 and the eye of the hand with 20a. The eye is reinforced with an apertured bushing 20b. The inside wall of the bushing 20b in this case too is provided with grooves 20b', which correspond to the fine grooves on the attachment 1a of the hour tube (FIG. 1a).

FIG. 1d shows a part of a hand 3. The eye 3a of this hand is provided with an aperture or bore by means of which the hand is placed onto the attachment 1a of the hour tube (FIG. 1a). The eye 3a of the hand is provided with a slit 3b which opens into the aperture. This slit 3b forms, or defines, edges 3b' on the inside wall of the bore, which edges can possibly be further provided with a small ridge. These edges 3b' are axially extending and engage with the grooves 1a' of the attachment 1a of the hour tube (FIG. 1a) to bring about a firm hold of the hand on the attachment 1a. If ridges are provided at the edges, then these ridges will engage the grooves 1a'.

FIG. 1e shows a part of a hand 30, the end of which is provided with an apertured bushing 31 to be placed on the hour tube. This bushing is slit twice at 31b. These slits 31b open into the aperture and form axialy extending edges 31b' which possibly still have a smaller ridge after being processed. The edges 31b', together with any remaining ridges, engage the delicate grooves of the attachment 1a of the hour tube when the hand is placed thereon. As a result, the desired firm seat is guaranteed.

The hands according to FIGS. 1b and 1c can consist preferably of plastic, while the hands according to FIGS. 1d and 1e are preferably of metal. Naturally, the hand according to FIG. 1d can also be provided with a reinforced eye, especially whenever it is made of metal.

FIG. 2 shows a cut through an hour tube, the attachment of which is designated by 1a. The attachment is provided with delicate grooves 1a', in accordance with FIG. 1a. A minute shaft 4 penetrates the hour tube. Especially in the area of the part of the attachment 1a on which the hand is placed, the hour tube can be provided with a cylindrical enlargement 1b, by which a free space is created between the hour tube and the minute shaft 4. This will prevent the hour tube from running or pressing against the minute shaft 4, which under certain circumstances can be caused by the fact that the hand tends to contract the attachement 1a somewhat.

The preferred embodiment of the invention has been explained on the basis of an apertured hand fastening on the attachment of an hour wheel for a watch. Naturally the arrangement according to the invention can also be used for the attachment of a hand on a minute tube or the minute shaft or the seconds shaft of a watch. The attachment of the hand, according to the invention, can also be used in the case of other instruments where an indicator hand of some type must be attached on a shaft or a tube.

SUMMARY OF MAJOR ADVANTAGES AND SCOPE OF THE INVENTION

The invention provides a unique arrangement wherein a firm gripping engagement is provided between a plastic part of a gear mechanism and an indicator hand in spite of the use of a plastic attachment portion.

This firm gripping engagement is provided without hindering the installation and adjustment operations normally featured between the hand and the gear.

The invention includes numerous variations of the basic concept making the improvement suitable for use in many, if not all, presently utilized devices.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a timepiece having a driven gear mechanism; and a hand drivingly mounted on said gear mechanism; said hand including wall means defining an aperture; and said gear mechanism including a plastic shaft firmly grippingly receiving the aperture of the hand; the improvement wherein:
    said plastic shaft includes a plurality of radially extending and longitudinally oriented projections firmly gripping said aperture-defining wall means to effect a firm gripping engagement between said plastic shaft and said hand while affording alignment turning of said hand about said plastic shaft; said wall means including at least one slit opening into said aperture; an axially extending edge of said slit defining a projection engageable with said projections on said plastic portion.

2. The watch according to claim 1 wherein said gear mechanism comprises an hour wheel; and said plastic shaft being tube-like and comprising an attachment portion of said hour wheel.

3. The watch according to claim 1 wherein said projections are defined by axially extending grooves, said grooves are defined by substantially smooth sidewalls extending at an angle of at least 90°.

4. The watch according to claim 1 wherein said wall means includes an axially extending bushing; said aperture extending through said bushing; and said at least one slit being formed in said bushing.

* * * * *